Oct. 4, 1949.   F. T. BARR   2,483,485
HIGH-VELOCITY FLUID SOLIDS TECHNIQUE
Filed Dec. 31, 1947
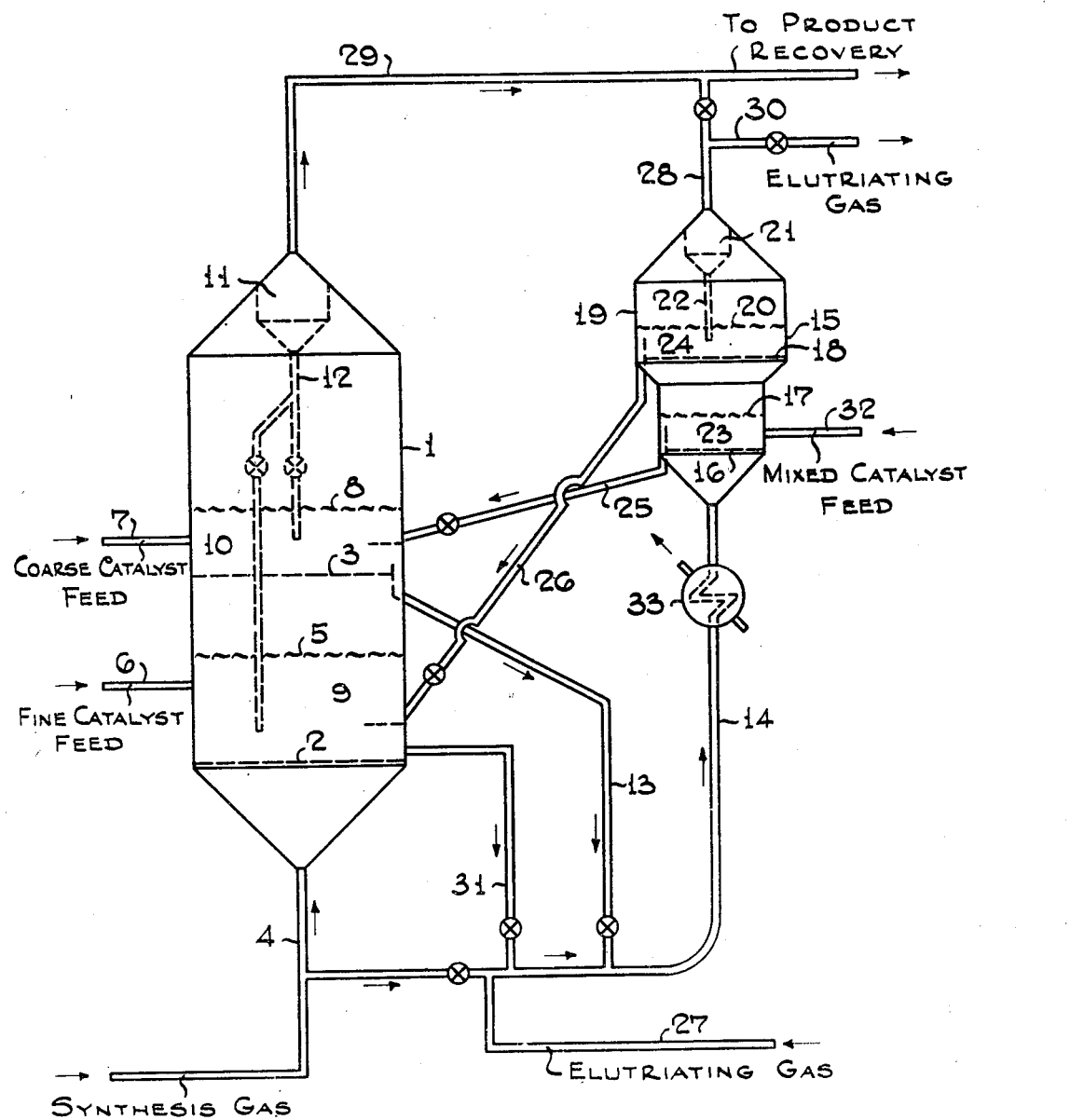
Frank T. Barr  Inventor
By J. Cushman  Attorney Patented Oct. 4, 1949

2,483,485

UNITED STATES PATENT OFFICE 2,483,485

HIGH VELOCITY FLUID SOLIDS TECHNIQUE

Frank T. Barr, Summit, N. J., assignor to Standard Oil Development Company, a corporation of Delaware Application December 31, 1947, Serial No. 794,918

7 Claims. (Cl. 260—449.6)

The present invention relates to the contacting of subdivided solid particles and gases. More particularly, the present invention relates to a process and an apparatus for contacting solids with gases upflowing at velocities which normally carry substantial quantities of solid catalyst particles overhead in the conventional type fluidized solids reactor.

Processes wherein fluidized solids are contacted with gases have several important advantages over other types of gas-solid contacting processes. The fluidized solids operations are characterized by (1) a high degree of intimacy of contact between the gas and the solid particles, (2) a substantial uniformity of temperature throughout the catalyst bed as a result of the rapid circulating of the solids and the accompanying extremely rapid rate of heat transfer from one section of the bed to another and (3) the ease of control of temperature level of the fluidized bed.

The fluid technique of contacting subdivided solids with gases has found extensive application in many types of chemical processes, both catalytic and non-catalytic, exothermic and endothermic. Among the catalytic processes may be mentioned catalytic cracking of petroleum oils, the synthesis of hydrocarbons by the Fischer synthesis reaction, and the like. Among non-catalytic processes are various reduction reactions, as of ores, carbonization of finely-divided coal and preparation of synthesis gas for the hydrocarbon synthesis reaction.

Advantageous as the fluidized technique has shown itself to be, the art as hitherto disclosed has several inherent limitations which thus far, have limited the scope of its usefulness and applicability, and have limited its efficiency in many fields in which it is now employed.

One of these limitations is the problem of entrainment of fine particles when the operation is carried out under pressure. It has been experimentally verified that particle carry-over in a fluidized process at a given linear velocity increases with the pressure imposed on the fluidized bed. Thus in the synthesis of liquid hydrocarbons from carbon monoxide and hydrogen using the fluid technique with a promoted iron catalyst and pressures of 100 p. s. i. g. and above, superficial linear gas velocities which are quite satisfactory in the neighborhood of atmospheric pressures are under some conditions sufficient to carry overhead from the catalyst bed an unsatisfactory large amount of catalyst. If, at the higher pressures, superficial velocities are maintained low enough to avoid excessive loss of catalyst of fine size, greater vessel cross-section is required and poorer heat transfer is obtained from the fluidized mass of catalyst, since high superficial velocities are associated with better heat transfer, mixing, and contacting. On the other hand, if catalyst of larger particle size is used, the desirable catalytic and fluidizing properties characteristic of smaller particles are not available.

The primary purpose of the present invention is to provide an improved method of and apparatus for carrying out the contacting of solids and gases in a fluidized bed which will not be subject to the limitations mentioned, and will thus permit a wider application of this technique. Another important object of the invention is to provide an improved method for carrying out high velocity fluid solid operations without excessive loss of subdivided solids from the system. Still another object of the invention is to provide an improved method of separating fractions of subdivided solids of different state of subdivision or buoyancy. Other objects and advantages of the invention will become apparent from the description hereinafter.

It has now been found that the advantages of the high velocity small particle fluid technique may be realized without the disadvantageous overhead loss of small particles and without uneconomic construction of a large reaction vessel by employing at least two fluid solids beds of different particle size in a single fluid reaction vessel or housing. In this process the gasiform fluidizing medium is passed through a fluid reactor of such size as to give a superficial linear velocity in the range of 1 to 10 feet per second. The fluidizing gas passes first through a fine particle bed of fluidizable solids, and at this relatively high velocity, carry-over from this bed is excessive. A second bed of relatively large particles, such that carry-over from this bed is insignificant, is provided, and this bed functions to remove small entrained particles from the bed below.

Unless, however, the concentration of fine particles in the upper bed is kept relatively low, e. g. less than about 30%, the small particles will be elutriated from the large particle bed by the upwardly flowing gases and lost from the system. Solids from the upper bed are therefore withdrawn either intermittently or continuously and charged to a controlled velocity fluid-type elutriator vessel, in which the solids are classified into two beds according to their size and buoyancy, and these are returned to the corresponding beds in the reactor.

Though the present invention will find application wherever it is desired to contact solids with gases in order to effect a physical or chemical change in either the solid or the gas or both, the invention will find particular application in fluid operations which are carried out under superatmospheric pressures. One such operation that is especially indicated is the catalytic reaction of carbon monoxide and hydrogen to form valuable liquid and gaseous hydrocarbons and oxygenated organic products. This operation is preferably carried out at pressures from 400–600 p. s. i. g. in the presence of, for example, a fluidized promoted iron catalyst, and by means of the secondary large particle bed of the present invention, higher superficial velocities than have hitherto been found practicable may be advantageously employed, deriving all the benefits of higher velocities as enumerated above.

This invention shows that employing high gas velocities in the fluidized solids technique, the entrained fines from one bed can be largely filtered in an upper separate bed of larger sized fluidized solids by passing a fluidizing gasiform stream upwardly serially through the lower and upper beds. This is possible most effectively and efficiently when the solids in the uppermost layer are continually withdrawn and separated from any accumulated (filtered) fines and when the thus separated large size particles are returned to the said upper bed and the separated fines are at least in part returned to the said lower bed.

The invention will best be understood by referring to the accompanying diagrammatic representation of one modification of the present invention. In the description, the operation of the invention will be exemplified by its application to the hydrocarbon sythesis process, though it is to be understood that the invention is applicable to any process involving the contacting of subdivided solids with gases in order to effect physical or chemical changes. Thus, in co-pending application Serial No. 107,067, filed July 27, 1949, which is a continuation-in-part of the present invention, the application of the invention to the carbonization of carbonizable materials is claimed.

Referring now in detail to the drawing, which represents schematically a fluidized solid operation, 1 is a reactor preferably in the form of a vertical cylinder with a conical base, having one grid or screen 2 located in the lower section and a second grid or screen 3 intermediate between grid 1 and the top of the reactor. The purpose of such screens or grids is to support beds of small size solids thereon separate from one another and to provide suitable distribution for the fluidizing gasiform medium whereby separate beds of the solids may be fluidized on the different grids. The size of the openings in grid 3 are such that entrained fines from below can readily pass up therethrough into the upper bed along with the fluidizing medium. The number of grid openings and their size are such that substantially none of the larger size solids in the upper bed pass downwardly into the lower bed, as will be made more clear below. A synthesis gas feed mixture of $H_2$ and CO in the ratio of about 2 mols $H_2$ to 1 mol CO is introduced into reactor 1 through line 4 and flows upward through screen 2.

Within reaction vessel 1 a mass of subdivided alkali metal promoted iron catalyst having a particle size distribution such that less than 20% of the particles have diameters 0–20 microns and less than 10% of the particles larger than 80 microns is maintained in the form of a dense, turbulent bed, having a well-defined upper level 5. This catalyst may be supplied to reactor 1 through line 6. The superficial velocity of the gases within reactor 1 may be held as high as 5 to 10 feet per second, although preferably an upper limit of 4–5 feet per second is desirable. It will be understood that lower superficial velocity may be used, satisfactory fluidization ordinarily being obtained as low as 0.5–1.0 foot per second, but the fundamental advantage of the present invention is not there realized. Under these conditions the catalyst in zone 9 assumes the form of a turbulent mass, resembling a boiling liquid with more or less well defined upper level and having an apparent density of about 25 to 75 lbs. per cubic foot. The precise characteristics depend upon fluidization conditions, the lower apparent density and more poorly defined level being associated with the higher velocities. The pressure within the reactor is maintained at from about 400 to about 650 p. s. i. g. depending upon the type of conversion product desired, and the temperature within the fluidized mass is kept uniform in the range 600°–750° F. by appropriate methods of temperature control, such as cooling jacket or internal or external coil (not shown). The major portion of the synthesis reaction takes place in primary reaction zone 9.

Volatile reaction products, unreacted synthesis gas, and entrained solid particles are withdrawn from the disperse phase above upper level 5 and are passed through screen or grid 3 into the secondary fluid catalyst reaction zone 10. The catalyst particles comprising the fluidized bed in this zone have a particle size such that less than 10% have diameters less than 80 microns and 80% have diameters ranging preferably between 80–500 microns, though particles with diameters as large as 2500 microns may be employed. Catalyst may be introduced to this zone from a hopper through line 7. It is maintained in a fluidized mass resembling a boiling liquid having a well-defined upper level 8 by means of the gasiform reaction products and unreacted synthesis gas entering through and being dispersed by screen or grid 3. Further conversion of synthesis gas into hydrocarbons and oxygenated hydrocarbons is carried out in this second reaction zone and the smaller particles entrained from the fine particle bed 9 are effectively removed from the upflowing gas stream by passing through the large particle bed 10. Entrained solids leaving upper bed are substantially removed by passing the gasiform products and gases through cyclonic separator 11, which is equipped with dip pipe 12 to return particles below the upper level of the dense phase in the fluidized beds.

Unless, however, the concentration of fine particles in upper bed 10 is kept low, e. g. less than 30% and preferably less than 10%, the small particles will be elutriated from the large particle bed 10 and lost from the system. Catalyst from the upper bed is therefore withdrawn either intermittently or preferably continuously through line 13, suspended in an elutriating gas and is charged through line 14 into the bottom of a controlled velocity fluid-type elutriator vessel 15. This vessel consists of two sections, one of such cross-section as to give a high superficial gas velocity, and the second and upper one of increased cross-section to reduce gas velocity to the point where fine particles will not significantly be carried out of the vessel.

Through line 14 the catalyst withdrawn from large particle bed 10, and elutriating gas are charged into the bottom of the elutriator vessel 15 and pass upward through distributing grid 16. The velocity of the system is here so controlled that in the narrower part of vessel 15 above grid 16 the superficial velocity maintains the larger diameter, less buoyant particles in a fluidized state, forming a fluid bed 23 with upper level 17, the dense phase being composed substantially of those particles having a size of about 80 microns and above. In general, the superficial velocity of elutriating gas thru bed 23 will be higher than that through reactor bed 10 in order to provide the necessary differential elutriating effect. This increase may be of the order of 1 foot per second or more.

The smaller, more buoyant particles are entrained by the elutriating gas and pass upward through a second grid or screen 18 into the expanded section 19 of elutriator vessel 15. Here the superficial velocity of the upward moving gas stream is substantially diminished, preferably to less than 1.5–2 feet per second, and a second fluid bed 24 of lower particle size is built up and maintained in a fluidized condition, with a dense phase boundary marked by a well-defined upper level 20. A cyclonic dust separator 21 with dip line 22 extending below upper level 20 returns last traces of entrained solids to the dense phase in fluid bed 24.

The larger particles from fluid particle bed 23 are intermittently or preferably continuously returned by line 25 to the large particle fluid bed 10 in the reactor vessel 1, and likewise the smaller particles from fluid bed 24 are returned through line 26 to the corresponding fluid bed 9 in reactor 1.

The two sizes of catalyst, instead of being charged respectively thru lines 6 and 7, may be charged as a mixture to the elutriator thru line 32, allowing the separation of sizes for beds 9 and 10 to be naturally established, and saving a sizing step in preparation of the catalyst.

As elutriating gas there may be used inert gas such as flue gas, either prepared for the purpose or obtained from another point of the process such as tail gas, and which is introduced into the system through line 27. Also, a synthesis gas mixture of CO and $H_2$ may be used as the elutriating medium in vessel 15. In the latter case elutriating vessel 15 is equipped with a means of temperature control, such as heating jacket or internal coil (not shown) to control reaction in the elutriation step. The elutriating gas is withdrawn from the dilute phase above small particle fluid bed 24 through cyclonic separator 21 and is passed through line 28 either to the products recovery system along with the synthesis products from reactor 1 through line 29, or it is separately withdrawn through line 30.

The present invention is of further marked advantage when it is desirable or necessary to regenerate regularly the synthesis or other type catalyst. In such cases, the regenerating gas is profitably utilized in the elutriating step of the invention, combining the elutriating and regenerating steps, and thus markedly saving in operation cost and time. In the case of spent and partially spent hydrocarbon synthesis catalyst the regeneration may proceed by way of oxidation, reduction, or oxidation followed by reduction, depending upon synthesis conditions and operation factors. Oxidizing gases may be oxygen, air, carbon dioxide, or steam, and reducing gases hydrogen or synthesis gas with a high $H_2$ to CO ratio. The regeneration gas in which is suspended the catalyst withdrawn from the secondary large particle bed 10 in reactor 1 is passed into the bottom of elutriating vessel 15 through line 14, forming two fluidized beds in the elutriator vessel 15 as already described. Temperature levels suitable for regeneration, which are substantially above hydrocarbon synthesis levels, may be supplied by external means, as by coils and jackets, or by partial combustion of the carbonaceous material adhering to the catalyst, or partial combustion of regenerating gases. Spent regenerating gases are withdrawn through cyclonic dust separator 21 and after heat exchange, may be vented or supplied to another part of the system. The regenerated solid catalyst is withdrawn from fluidized beds 23 and 24 and transferred to beds 10 and 9 respectively in reactor 1.

The embodiment of the invention as illustrated in the figure and in the foregoing description admits of modifications readily apparent to those skilled in the art. The reactor vessel 1 may have an upper expanded section above the level 8 of the secondary large particle bed 10 in order to decrease the superficial velocity of the upflowing gases and cut down elutriation from said bed. The elutriator 15 may be a packed vessel filled with Raschig rings, Berl saddles, or the like, to prevent top-to-bottom mixing, and two fluid beds are built up in a manner analogous to that described above. For circulating the solids between reactor and elutriator, standpipes, mechanical conveyors, lock hoppers etc. may be used. The reactor and elutriator may have additional lines for purging and emptying the respective vessels. One such line 31 for removing catalyst from the lower dense bed in reactor 1 is shown in the figure. In a reaction as described, or in equivalent exothermic and endothermic reactions, it is within the concept of the invention to have suitable means for cooling or heating the reactor and elutriator, such as coils or jackets, to remove or to supply heat of reaction.

Under certain circumstances it may be desirable to use an elutriating or classifying vessel having more than two fluidized beds instead of the two fluidized bed vessel 15. Thus if it is desired to remove or segregate catalyst particles of greater and/or smaller than the desired fluidizable size, such as agglomerated particles or fines respectively, from the catalyst stream it may be advantageous to use an elutriation vessel having grids of such size openings and cross-section areas, and to maintain such velocity of the elutriating gas, that a plurality of fluidized beds is formed, one above each grid; when catalyst is fed into the bottom of such a vessel from a fluid reactor the heaviest particles, such as agglomerates, remain in the lowest bed and the fines of less than fluidizable size are entrained and migrate to the topmost bed. Likewise, if the catalyst is added into an intermediate zone of such an elutriator heavier particles will migrate downward and the fines upward. The particles of the desired fluidizable size may be transferred from intermediate fluidized particle zones to the reactor as described above, and particles of greater or lower buoyancy than desired may be segregated and further processed or discarded.

The foregoing description, though illustrating a specific application of the invention is not intended to exclude other modifications obvious to those skilled in the art, and which are within the scope of the invention.

I claim:

1. In the process in which finely divided solids are maintained in a fluidized state by upwardly flowing gases, the improvement which comprises maintaining at least two separated fluidized solids reactions zones, one of said zones being elevated with respect to the other, said elevated zone being further characterized in that it comprises fluidizable solid particles of substantially larger average particle size than the lower zone, passing gaseous fluidizing medium through said lower zone at velocities sufficient to entrain a portion of the particles comprising said lower zone, carrying out chemical reactions in said lower zone catalyzed by said particles, passing said fluidizing gases from said lower zone initially containing said entrained solids upwardly through the bed of fluidized solids in said elevated zone, carrying out chemical reactions in said elevated zone catalyzed by said larger sized particles, depositing the major portion of said entrained solids in said last-named bed, discharging the gasiform fluidizing stream comprising catalytic reaction products substantially free of said entrained particles from above the bed of solids in said elevated zone, withdrawing fluidizable solid particles from said last-named zone, transferring said particles to a classification zone, separating fluidizable particles of small particle size from fluidizable particles of substantially larger average particle size in said classification zone, conveying fluidizable particles of small particle size to said lower fluidized zone and conveying fluidizable particles of substantially greater average particle size to said elevated fluidized zone.

2. The process of claim 1 in which a pressure appreciably greater than atmospheric is maintained in said lower and said upper fluidized solid particles reaction zones.

3. The process of claim 1 comprising transferring said particles withdrawn from said elevated zone of fluidized solids to a fluidized elutriation zone, passing an elutriating gas through said zone, and separating fluidizable solid particles of small particle size from fluidizable solid particles of substantially greater average particle size.

4. An improved process for converting carbon monoxide and hydrogen to normally liquid hydrocarbons and oxygenated products which comprises contacting carbon monoxide and hydrogen in synthesis proportions at synthesis conditions with a dense turbulent fluidized mass of finely divided synthesis catalyst having a particle size of from about 20 to about 80 microns in a fluidized solids reaction zone, forming volatile reaction products in said zone, withdrawing upwardly flowing volatile reaction products, gasiform reactants, and entrained catalyst from said zone, passing said reaction products, reactants, and entrained catalyst into an elevated reaction zone of fluidized solids comprising said fluidized synthesis catalyst having an average particle size appreciably greater than 80 microns to about 2500 microns, and withdrawing volatile reaction products and reactants substantially free of entrained catalyst from said elevated zone.

5. The process of claim 4 comprising the steps of withdrawing fluidized synthesis catalyst from said elevated reaction zone of fluidized solid particles, conveying said catalyst to an elutriation zone, passing an elutriating gas through said elutriating zone, controlling the superficial velocity of the elutriating gas so as to form a lower fluidized bed of catalyst particles of particle size appreciably greater than 80 microns to about 2500 microns and an elevated fluidized bed of catalyst particles of particle size of from about 20 to about 80 microns, and conveying the catalyst from the two fluidized beds in the elutriation zone to the corresponding beds in the hydrocarbon synthesis zone.

6. The process of claim 5 in which said elutriating gas is flue gas.

7. The process of claim 5 comprising passing a synthesis catalyst regenerating gas under synthesis catalyst regenerating conditions as an elutriating agent through said elutriating zone.

FRANK T. BARR.

REFERENCES CITED

The following references are of record in the file of this patent:

UNITED STATES PATENTS

| Number | Name | Date |
| --- | --- | --- |
| 2,396,709 | Leffer | Mar. 19, 1946 |